US012812530B2

(12) United States Patent
Zhou

(10) Patent No.: US 12,812,530 B2
(45) Date of Patent: Nov. 24, 2026

(54) METHOD AND APPARATUS FOR PDCCH MONITORING IN UNLICENSED SPECTRUM, METHOD AND APPARATUS FOR PDCCH INDICATING IN UNLICENSED SPECTRUM, STORAGE MEDIUM, TERMINAL AND BASE STATION

(71) Applicant: SPREADTRUM COMMUNICATIONS (SHANGHAI) CO., LTD., Shanghai (CN)

(72) Inventor: Huayu Zhou, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 799 days.

(21) Appl. No.: 17/266,325

(22) PCT Filed: Jun. 26, 2019

(86) PCT No.: PCT/CN2019/093018
§ 371 (c)(1),
(2) Date: Feb. 5, 2021

(87) PCT Pub. No.: WO2020/029703
PCT Pub. Date: Feb. 13, 2020

(65) Prior Publication Data

US 2021/0321331 A1 Oct. 14, 2021

(30) Foreign Application Priority Data

Aug. 10, 2018 (CN) ......................... 201810909944.9

(51) Int. Cl.
*H04W 52/02* (2009.01)
*H04W 56/00* (2009.01)
(Continued)

(52) U.S. Cl.
CPC ... *H04W 52/0216* (2013.01); *H04W 52/0225* (2013.01); *H04W 56/001* (2013.01);
(Continued)

(58) Field of Classification Search
CPC . H04W 72/0446; H04W 72/23; H04W 56/00; H04L 5/0048
See application file for complete search history.

(56) References Cited

U.S. PATENT DOCUMENTS

2017/0127414 A1 5/2017 Yi et al.
2018/0054342 A1 2/2018 Nory et al.
(Continued)

FOREIGN PATENT DOCUMENTS

CN 106464642 A 2/2017
CN 106937404 A 7/2017
(Continued)

OTHER PUBLICATIONS

AT&T, "Frame structure for NR-U operation", 3GPP TSG RAN WG1 Meeting #93, R1-1806987, Busan, Korea, May 21-25, 2018, 3 pages.
(Continued)

*Primary Examiner* — Fred A Casca
(74) *Attorney, Agent, or Firm* — CANTOR COLBURN LLP

(57) ABSTRACT

Method and device for PDCCH monitoring and indicating in unlicensed spectrum, storage medium, terminal, and base station. The monitoring method comprises: determining a time domain position of an SSB in an SSB group sent by a network within a first time window, wherein the time domain position of the SSB in the SSB group has a preset association with PDCCH monitoring occasions in PDCCH monitoring occasion groups: determining, according to the preset association and in each PDCCH monitoring occasion
(Continued)

group within a second time window, a PDCCH monitoring occasion at which monitoring needs to be performed so as to monitor a PDCCH at the PDCCH monitoring occasion in each PDCCH monitoring occasion group within the second time window, wherein the first time window and the second time window are predefined. The present invention prevents UE from frequently monitoring a PDCCH, reduces power consumption and decoding complexity, and improves user experience.

14 Claims, 3 Drawing Sheets

(51) Int. Cl.

| | |
|---|---|
| ***H04W 72/0446*** | (2023.01) |
| ***H04W 72/23*** | (2023.01) |
| ***H04W 74/0816*** | (2024.01) |

(52) U.S. Cl.

CPC ....... *H04W 72/0446* (2013.01); *H04W 72/23* (2023.01); *H04W 74/0816* (2013.01)

(56) References Cited

U.S. PATENT DOCUMENTS

| | | | | |
|---|---|---|---|---|
| 2018/0212736 | A1 | 7/2018 | Chatterjee et al. | |
| 2020/0008131 | A1* | 1/2020 | Chakraborty ......... | H04W 16/28 |
| 2021/0274561 | A1* | 9/2021 | Li ....................... | H04W 56/001 |

FOREIGN PATENT DOCUMENTS

| | | | |
|---|---|---|---|
| CN | 107852292 | A | 3/2018 |
| WO | 2017015787 | A1 | 2/2017 |

OTHER PUBLICATIONS

International Search Report for International Application No. PCT/CN2019/093018; Date of Mailing, Sep. 18, 2019.

Vivo, “Design considerations for standalone operations in NR unlicensed spectrum”, 3GPP TSG RAN WG1 Meeting #92, R1-1801558, Athens, Greece, Feb. 26-Mar. 2, 2018, 4 pages.

Bertenyi et al., “5G NR Radio Interface”; Journal of ICT, vol. 6_1&2, pp. 31-58 (2018).

EPO Extended European Search Report for corresponding EP Application No. 19848190.5; Issued on Mar. 30, 2022.

Huawei “NR licensed assisted and standalone operation on unlicensed bands”; 3GPP TSG RAN WG1 Meeting #92; R1-180368; Feb. 26-Mar. 2, 2018; 4 pages.

PIN First Office Action for corresponding IN Application No. 202117009440; Issued on Jun. 4, 2022.

Mediatek Inc. “Remaining Issues for PF/PO Allocaiton in NR”; 3GPP TSG-RAN WG2 NR AH1807 Meeting; R2-1810561; Jul. 2-6, 2018; 4 pages.

Spreadtrum Communications “Remaining issues on paging design”; 3GPP TSG RAN WG1 Meeting #92; R1-1801838; Feb. 26-Mar. 2, 2018; 4 pages.

* cited by examiner

METHOD AND APPARATUS FOR PDCCH MONITORING IN UNLICENSED SPECTRUM, METHOD AND APPARATUS FOR PDCCH INDICATING IN UNLICENSED SPECTRUM, STORAGE MEDIUM, TERMINAL AND BASE STATION

CROSS-REFERENCE TO RELATED APPLICATIONS

This is the U.S. national stage of application No. PCT/CN2019/093018 filed on Jun. 26, 2019. Priority under 35 U.S.C. § 119(a) and 35 U.S.C. § 365(b) is claimed from Chinese Application No. 201810909944.9, filed Aug. 10, 2018, the disclosure of which is also incorporated herein by reference.

TECHNICAL FIELD

The present disclosure generally relates to radio communication technology field, and more particularly, to a method and apparatus for Physical Downlink Control Channel (PDCCH) monitoring in an unlicensed spectrum, a method and apparatus for PDCCH indicating in an unlicensed spectrum, a storage medium, a terminal and a base station.

BACKGROUND

The 3rd Generation Partnership Project (3GPP) standards organization will study how to deploy the Fifth-Generation mobile communications (5G) New Radio (NR) system on an unlicensed spectrum, so as to achieve fair and effective usage of the unlicensed spectrum and increase a data transmission rate of the NR system.

Existing 3GPP Long Term Evolution (LTE) systems adopt a License Assisted Access (LAA) technology to communicate in the unlicensed spectrum. The LAA technology adopts a Listen-Before-Talk (LBT) mechanism to realize the coexistence of different communication systems (for example, an LTE system and a Wi-Fi system) in the unlicensed spectrum. A basic principle of the LBT mechanism lies in that: before transmitting data in the unlicensed spectrum, a node uses a Clear Channel Assessment (CCA) mechanism to determine whether a current channel is available according to a result of energy detection. Some regional laws and regulations set an energy detection threshold. If the energy received by the node is higher than the energy detection threshold, the channel is considered to be busy and unavailable.

If both a Synchronization Signal Block (SSB) and a PDCCH use unlicensed spectrum resources for transmission, the LBT mechanism may be used to acquire a channel occupancy time of the unlicensed spectrum before transmitting the SSB and/or PDCCH. Afterward, a network can transmit the SSB and/or PDCCH on the unlicensed spectrum acquired based on the LBT mechanism. However, the LBT mechanism may cause the SSB and/or PDCCH transmitted by the network on the unlicensed spectrum resources to be greatly random. If a User Equipment (UE) monitors the PDCCH when there are many possible locations for PDCCH monitoring occasions, it may greatly increase complexity of blind detection of the PDCCH, increase power consumption of the UE, and reduce user experience.

SUMMARY

Embodiments of the present disclosure provide solutions for determining a PDCCH monitoring occasion on unlicensed spectrum resources to reduce decoding complexity of PDCCH, reduce power consumption of a terminal, and improve user experience.

In an embodiment of the present disclosure, a method for PDCCH monitoring in an unlicensed spectrum is provided, including: determining a time domain position of at least one SSB in at least one SSB group transmitted by a network within a first time window, wherein the time domain position of the at least one SSB in the at least one SSB group has a preset association with at least one PDCCH monitoring occasion in at least one PDCCH monitoring occasion group; and determining, based on the preset association and in each PDCCH monitoring occasion group within a second time window, a PDCCH monitoring occasion at which monitoring needs to be performed, so as to monitor the PDCCH at the PDCCH monitoring occasion in each PDCCH monitoring occasion group within the second time window PDCCH, wherein the first time window and the second time window are predefined.

Optionally, there are one or more SSB groups in the first time window, and the SSB group is a predefined set of several SSBs.

Optionally, the method further includes: before determining the time domain position of the at least one SSB in the at least one SSB group transmitted by the network within the first time window, detecting the at least one SSB transmitted by the network within the first time window.

Optionally, there are one or more PDCCH monitoring occasion groups in the second time window, and the PDCCH monitoring occasion group is a predefined set of several PDCCH monitoring occasions.

Optionally, a start time of the first time window is earlier than or equal to a start time of the second time window.

Optionally, the preset association refers to an association between an n-th SSB in the SSB group and an n-th PDCCH monitoring occasion in each PDCCH monitoring occasion group, where n is an integer.

In an embodiment of the present disclosure, a method for PDCCH indicating in an unlicensed spectrum is provided, including: determining a time domain position of at least one SSB in at least one SSB group within a first time window; determining a time domain position of at least one PDCCH monitoring occasion group in a second time window; and based on a preset association between the time domain position of the at least one SSB in the at least one SSB group and at least one PDCCH monitoring occasion in the at least one PDCCH monitoring occasion group, determining a PDCCH monitoring occasion that needs to be used in the PDCCH monitoring occasion group, so that a UE monitors the PDCCH at the PDCCH monitoring occasion, wherein the first time window and the second time window are predefined.

Optionally, there are one or more SSB groups in the first time window, and the SSB group is a predefined set of several SSBs.

Optionally, determining a time domain position of at least one SSB group within a first time window includes: in the first time window, acquiring a channel occupancy time of an unlicensed spectrum based on LBT mechanism to determine the time domain position of the at least one SSB group within the first time window.

Optionally, the method further includes: after determining the time domain position of the at least one SSB in the at least one SSB group within the first time window, transmitting the at least one SSB to the UE within the first time window.

Optionally, determining a time domain position of at least one PDCCH monitoring occasion group in a second time window includes: in the second time window, acquiring a channel occupancy time of the unlicensed spectrum based on LBT mechanism to determine the time domain position of the at least one PDCCH monitoring occasion group in the second time window.

Optionally, there are one or more PDCCH monitoring occasion groups in the second time window, and the PDCCH monitoring occasion group is a predefined set of several PDCCH monitoring occasions.

Optionally, a start time of the first time window is earlier than or equal to a start time of the second time window.

Optionally, the preset association refers to an association between an n-th SSB in the SSB group and an n-th PDCCH monitoring occasion in each PDCCH monitoring occasion group, where n is an integer.

In an embodiment of the present disclosure, an apparatus for PDCCH monitoring in an unlicensed spectrum is provided, including: a first determination circuitry configured to determine a time domain position of at least one SSB in at least one SSB group transmitted by a network within a first time window, wherein the time domain position of the at least one SSB in the at least one SSB group has a preset association with at least one PDCCH monitoring occasion in at least one PDCCH monitoring occasion group; and a second determination circuitry configured to determine, based on the preset association and in each PDCCH monitoring occasion group within a second time window, a PDCCH monitoring occasion at which monitoring needs to be performed, so as to monitor the PDCCH at the PDCCH monitoring occasion in each PDCCH monitoring occasion group within the second time window PDCCH, wherein the first time window and the second time window are predefined.

Optionally, there are one or more SSB groups in the first time window, and the SSB group is a predefined set of several SSBs.

Optionally, the apparatus further includes: a detection circuitry configured to: before the time domain position of the at least one SSB in the at least one SSB group transmitted by the network within the first time window is determined, detect the at least one SSB transmitted by the network within the first time window.

Optionally, there are one or more PDCCH monitoring occasion groups in the second time window, and the PDCCH monitoring occasion group is a predefined set of several PDCCH monitoring occasions.

Optionally, a start time of the first time window is earlier than or equal to a start time of the second time window.

Optionally, the preset association refers to an association between an n-th SSB in the SSB group and an n-th PDCCH monitoring occasion in each PDCCH monitoring occasion group, where n is an integer.

In an embodiment of the present disclosure, an apparatus for PDCCH indicating in an unlicensed spectrum is provided, including: a first determination circuitry configured to determine a time domain position of at least one SSB in at least one SSB group within a first time window; a second determination circuitry configured to determine a time domain position of at least one PDCCH monitoring occasion group in a second time window; and a third determination circuitry configured to determine, based on a preset association between the time domain position of the at least one SSB in the at least one SSB group and at least one PDCCH monitoring occasion in the at least one PDCCH monitoring occasion group, a PDCCH monitoring occasion that needs to be used in the PDCCH monitoring occasion group, so that a UE monitors the PDCCH at the PDCCH monitoring occasion, wherein the first time window and the second time window are predefined.

Optionally, there are one or more SSB groups in the first time window, and the SSB group is a predefined set of several SSBs.

Optionally, the first determination circuitry includes a first acquisition sub-circuitry configured to: in the first time window, acquire a channel occupancy time of an unlicensed spectrum based on LBT mechanism to determine the time domain position of the at least one SSB group within the first time window.

Optionally, the apparatus further includes a first transmission circuitry configured to: after the time domain position of the at least one SSB in the at least one SSB group within the first time window is determined, transmit the at least one SSB to the UE within the first time window.

Optionally, the second determination circuitry includes a second acquisition sub-circuitry configured to: in the second time window, acquire a channel occupancy time of the unlicensed spectrum based on LBT mechanism to determine the time domain position of the at least one PDCCH monitoring occasion group in the second time window.

Optionally, there are one or more PDCCH monitoring occasion groups in the second time window, and the PDCCH monitoring occasion group is a predefined set of several PDCCH monitoring occasions.

Optionally, a start time of the first time window is earlier than or equal to a start time of the second time window.

Optionally, the preset association refers to an association between an n-th SSB in the SSB group and an n-th PDCCH monitoring occasion in each PDCCH monitoring occasion group, where n is an integer.

In an embodiment of the present disclosure, a storage medium having computer instructions stored therein is provided, wherein when the computer instructions are executed, any one of the above methods for PDCCH monitoring in an unlicensed spectrum or any one of the above methods for PDCCH indicating in an unlicensed spectrum is performed.

In an embodiment of the present disclosure, a terminal including a memory and a processor is provided, wherein the memory has computer instructions stored therein, and when the processor executes the computer instructions, any one of the above methods for PDCCH monitoring in an unlicensed spectrum is performed.

In an embodiment of the present disclosure, a base station including a memory and a processor is provided, wherein the memory has computer instructions stored therein, and when the processor executes the computer instructions, any one of the above methods for PDCCH indicating in an unlicensed spectrum is performed.

Embodiments of the present disclosure may provide following advantages.

An embodiment of the present disclosure provides a method for PDCCH monitoring in an unlicensed spectrum, including: determining a time domain position of at least one SSB in at least one SSB group transmitted by a network within a first time window, wherein the time domain position of the at least one SSB in the at least one SSB group has a preset association with at least one PDCCH monitoring occasion in at least one PDCCH monitoring occasion group; and determining, based on the preset association and in each PDCCH monitoring occasion group within a second time window, a PDCCH monitoring occasion at which monitoring needs to be performed, so as to monitor the PDCCH at the PDCCH monitoring occasion in each PDCCH monitoring occasion group within the second time window PDCCH, wherein the first time window and the second time window are predefined. By the embodiment, the preset association between the SSB on the unlicensed spectrum and the PDCCH monitoring occasion is established, so that the UE can determine the PDCCH monitoring occasion based on the preset association before decoding the PDCCH, and monitor the PDCCH at the PDCCH monitoring occasion to prevent the UE from overly monitor the PDCCH, thereby reducing decoding complexity, saving power consumption and improving user experience.

Further, there are one or more SSB groups in the first time window, and the SSB group is a predefined set of several SSBs. By the embodiment, an arrangement sequence of SSBs (for example, indexes of the SSBs) may be predefined, which makes it possible to establish the preset association.

Further, there are one or more PDCCH monitoring occasion groups in the second time window, and the PDCCH monitoring occasion group is a predefined set of several PDCCH monitoring occasions. By the embodiment, PDCCH monitoring occasions may be predefined, so that the at least one SSB in the at least one SSB group correspond to the at least one PDCCH monitoring occasion in the at least one PDCCH monitoring occasion group respectively, which makes it possible for the UE to determine the PDCCH monitoring occasion to be monitored.

DETAILED DESCRIPTION

Figure 1:
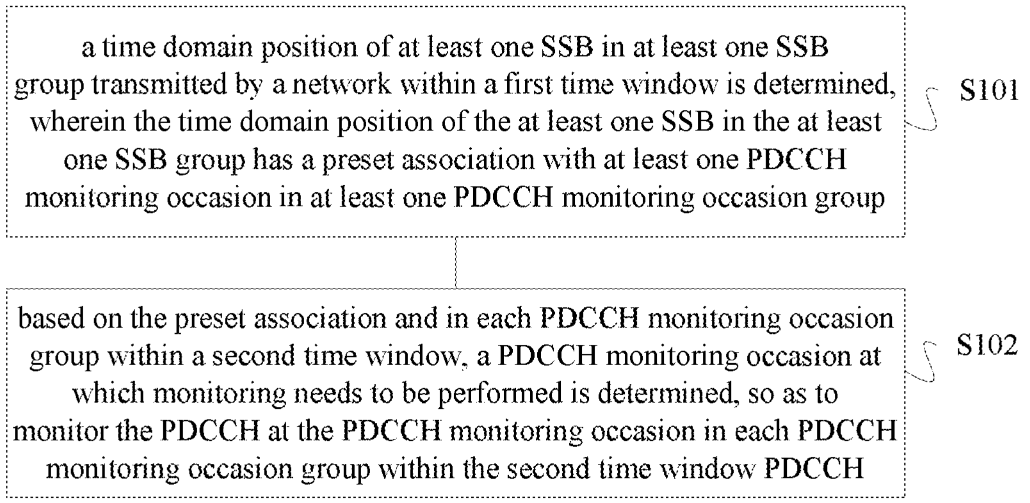
FIG. 1 is a flow chart of a method for PDCCH monitoring in an unlicensed spectrum according to an embodiment.

As described in the background, existing techniques lack a solution for determining a PDCCH monitoring occasion on an unlicensed spectrum, so that the UE can only blindly detect all possible PDCCHs, which may greatly increase power consumption of the UE and complexity of decoding PDCCHs, and reduce user experience.

Specifically, in the NR system, synchronization signals and broadcast channel signals are transmitted in the form of synchronization signal and physical broadcast channel blocks (referred to as synchronization signal blocks or SSBs for short). Further, the 5G system also introduces beam sweeping and other functions. Each synchronization signal block can be regarded as a resource corresponding to a beam in a beam scanning process. The synchronization signal block includes a Primary Synchronization Signal (PSS), a Secondary Synchronization Signal (SSS) and a Physical Broadcast Channel (PBCH) signal. Multiple synchronization signal blocks form a synchronization signal burst which can be regarded as a relatively concentrated resource containing multiple beams. And multiple synchronization signal bursts form a synchronization signal burst set. The synchronization signal block is repeatedly transmitted on different beams to complete the beam scanning process. Through beam scanning, the UE can determine on which beam a strongest signal is received.

For example, it may be assumed that time domain positions of L synchronization signal blocks within a 5 millisecond (ms for short) window are fixed. That is, a transmission time of the synchronization signal blocks within the 5 ms window is fixed, and indexes are also fixed, where the indexes from 0 to (L−1) of the L synchronization signal blocks are arranged consecutively in the time domain positions, and L is a positive integer.

Further, when the NR system is deployed on an unlicensed spectrum, the NR system can transmit the SSB on the unlicensed spectrum whose channel occupancy time is acquired, so that the UE can detect an unlicensed spectrum cell of the NR system through a cell search process. In some embodiments, the SSB can exist independently and broadcast in the cell. Alternatively, the SSB may be included in a Discovery Reference Signal (DRS) and broadcast in the cell.

It should be noted that the LTE Release 12 defines the DRS, so that the UE performs time-frequency tracking and measurement on a Secondary Cell (SCell) to complete network synchronization. Therefore, the DRS also has a "discovery" function of SCell. The DRS used in an LTE licensed spectrum is a long-period signal which has less interference to an entire network. The DRS may include PSS, SSS and Cell-specific Reference Signal (CRS). For Frequency Division Duplex (FDD) systems, a DRS duration is 1 to 5 consecutive sub-frames, for Time Division Duplex (TDD) systems, a DRS duration is 2 to 5 consecutive subframes. DRS may be configured and transmitted through Discovery Measurement Timing Configuration (DMTC). The UE may assume that one DRS appears in each DMTC cycle.

Further, in the LAA technology, DRS can still be used to "discover" a SCell on an unlicensed spectrum. Because of the long-period characteristic of DRS, interference to other LAA systems and other systems on the unlicensed spectrum (for example, a Wi-Fi system) can be reduced. It should be noted that a duration of the LAA DRS is 12 OFDM symbols in a non-empty subframe, and is shorter than that of the LTE DRS, so that the LAA DRS further reduces the interference to other LAA systems and Wi-Fi systems. The LAA DRS also includes PSS, SSS and CRS, and may occur in two situations. First, the UE may assume that LAA DRS appears in any subframe in DMTC, and the UE may assume that LAA DRS appears on a first subframe of DMTC configuration, and includes PSS, SSS and CRS. In other words, the UE may assume that in the DMTC, the base station uses LBT to compete for unlicensed spectrum resources to transmit DRS. If a channel occupancy time of the unlicensed spectrum is acquired, the base station transmits the DRS on a non-empty subframe. Second, when LAA DRS is simultaneously transmitted with Physical Downlink Shared CHannel (PDSCH), PDCCH and Enhanced PDCCH (EPDCCH), LAA DRS may only appear in subframe 0 and subframe 5. That is, if the DMTC contains subframe 0 or subframe 5, and the UE needs to monitor PDCCH and EPDCCH or receive PDSCH on subframe 0 or subframe 5, the UE may only detect DRS on subframe 0 or subframe 5 to obtain SSB.

For an NR system deployed on an unlicensed spectrum, the base station needs to perform LBT to acquire a channel occupancy time before transmitting DRS or SSB. The base station can transmit DRS or SSB only when the channel is detected to be idle. Due to the LBT, the transmission of DRS or SSB may need to be shifted backward for a period of time.

Further, in the NR system, Remaining Minimum System Information (RMSI) is equivalent to System Information Block 1 (SIB1) in the LTE system, and includes main system information except for Master Information Block (MIB). The RMSI is carried on a PDSCH, and the PDSCH is scheduled through a PDCCH. The PDSCH carrying the RMSI is usually called an RMSI PDSCH, and the PDCCH scheduling the RMSI PDSCH is usually called an RMSI PDCCH. In addition, common control messages such as Other System Information (OSI) and paging messages are also carried on a PDSCH which is scheduled through a PDCCH. The PDCCH scheduling an OSI PDSCH is usually called an OSI PDCCH, and the PDCCH scheduling a paging PDSCH is usually called a paging PDCCH. It should be noted that the RMSI may be transmitted in a certain transmission window which is agreed by the base station and the UE or configured by MIB or Radio Resource Control (RRC) signaling.

Further, the UE monitors a PDCCH at a PDCCH monitoring occasion to acquire control information carried in the PDCCH, where the PDCCH monitoring occasion is known by both the base station and the UE through predefinition or rules or signaling.

Further, the applicant found through research that, in the existing techniques, a PDCCH monitoring occasion of a public control message transmitted on a licensed spectrum is associated with the SSB. Specifically, when the base station transmits the PDCCH through beam sweeping, the UE can determine which beam to receive the PDCCH according to the association and the SSB.

For NR systems deployed on an unlicensed spectrum, signaling or data can only be transmitted after a channel occupancy time of the unlicensed spectrum is acquired. Therefore, the base station may first need to perform LBT to acquire the channel occupancy time of the unlicensed spectrum before transmitting the PDCCH of the public control message such as RMSI, OSI or a paging message. Due to the LBT, a transmission time of the PDCCH of the common control message may be delayed backward.

Further, when the SSB and/or PDCCH are transmitted after the LBT acquires the channel occupancy time of the unlicensed spectrum, the UE can only blindly check all possible PDCCHs, which may increase power consumption of the UE and complexity of decoding the PDCCHs, and reduce user experience.

An embodiment of the present disclosure provides a method for PDCCH monitoring in an unlicensed spectrum, including: determining a time domain position of at least one SSB in at least one SSB group transmitted by a network within a first time window, wherein the time domain position of the at least one SSB in the at least one SSB group has a preset association with at least one PDCCH monitoring occasion in at least one PDCCH monitoring occasion group; and determining, based on the preset association and in each PDCCH monitoring occasion group within a second time window, a PDCCH monitoring occasion at which monitoring needs to be performed, so as to monitor the PDCCH at the PDCCH monitoring occasion in each PDCCH monitoring occasion group within the second time window PDCCH, wherein the first time window and the second time window are predefined. By the embodiment, the preset association between the SSB on the unlicensed spectrum and the PDCCH monitoring occasion is established, so that the UE can determine the PDCCH monitoring occasion based on the preset association in advance, and decode the PDCCH at the PDCCH monitoring occasion to prevent the UE from overly monitor the PDCCH, thereby saving power consumption, reducing decoding complexity, and improving user experience.

In order to clarify the objects, characteristics and advantages of the disclosure, embodiments of present disclosure will be described in detail in conjunction with accompanying drawings.

FIG. 1 is a flow chart of a method for PDCCH monitoring in an unlicensed spectrum according to an embodiment. The method may be applied at a UE side, for example, performed by a UE. Referring to FIG. 1, the method may include S101 and S102.

In S101, a time domain position of at least one SSB in at least one SSB group transmitted by a network within a first time window is determined, wherein the time domain position of the at least one SSB in the at least one SSB group has a preset association with at least one PDCCH monitoring occasion in at least one PDCCH monitoring occasion group.

In S102, based on the preset association and in each PDCCH monitoring occasion group within a second time window, a PDCCH monitoring occasion at which monitoring needs to be performed is determined, so as to monitor the PDCCH at the PDCCH monitoring occasion in each PDCCH monitoring occasion group within the second time window PDCCH.

The first time window and the second time window may be predefined. The first time window and the second time window may be time windows for the network to acquire a channel occupancy time of the unlicensed spectrum, and may have periodicity. For example, the first time window and the second time window are defined in advance by the UE and the network through an agreement. Alternatively, the first time window and/or the second time window may be configured by RRC signaling. A start time of the first time window may be earlier than a start time of the second time window. Alternatively, the start time of the first time window may be the same as the start time of the second time window.

In S101, the base station may use the LBT mechanism to acquire the channel occupancy time of the unlicensed spectrum within the first time window and the second time window. After acquiring the channel occupancy time, the base station may transmit the at least one SSB to the UE in the first time window. To transmit SSBs on the unlicensed spectrum, the network and the UE may predefine time domain positions of multiple SSBs to successfully transmit the SSBs. The multiple SSBs may form an SSB group. In some embodiments, the base station and the UE may agree in advance that the SSBs are transmitted within the first time window through the SSB group.

Afterward, the UE deployed on unlicensed spectrum resources may receive the SSBs in the SSB group within the first time window. In some embodiments, as the UE may not know in advance a time (for example, time domain position) at which the base station acquires the channel occupancy time of the unlicensed spectrum in the first time window, the UE may perform continuous detection in the first time window to determine the strongest SSB in the SSB group to obtain the time domain position of the SSB to complete network synchronization.

In some embodiments, there are one or more SSB groups in the first time window, and the SSB group may be a predefined set formed by one or more SSBs. The SSB group may be an SSB burst set, an SSB burst, a subset of an SSB burst set, or the SSB itself. Alternatively, the SSB group may be obtained through a DRS set formed by several DRSs.

It should be noted that the SSB may be replaced by a DRS. Characteristics and functions of the SSB are the same as those of the DRS, and are not described in detail here.

Further, the at least one SSB in the at least one SSB group may have a preset association with the at least one PDCCH monitoring occasion in the at least one PDCCH monitoring occasion group. It should be noted that the at least one SSB in each SSB group correspond to the at least one PDCCH monitoring occasion in the at least one PDCCH monitoring occasion group in a one-to-one correspondence. The preset association may be used to determine the PDCCH monitoring occasion in the the PDCCH monitoring occasion group from the SSB in the SSB group.

The PDCCH monitoring occasion group may be a predefined set of one or more PDCCH monitoring occasions for beam scanning. The PDCCH may be a PDCCH for common control messages, such as an RMSI PDCCH, an OSI PDCCH or a paging PDCCH. Further, there may be one or more PDCCH monitoring occasion groups in the second time window.

In S102, after the LBT successfully acquires the channel occupancy time, the base station may determine the time domain position for transmitting the PDCCH based on the preset association, and transmit the PDCCH to the UE at the PDCCH monitoring occasion within the second time window.

Further, based on the preset association between an SSB detection result (for example, the time domain position of the at least one SSB in the at least one SSB group) and the at least one PDCCH monitoring occasion in the at least one PDCCH monitoring occasion group, the UE may select the PDCCH monitoring occasion in each PDCCH monitoring occasion group within the second time window to perform PDCCH monitoring at the PDCCH monitoring occasion, so as to monitor the PDCCH of the public control message, for example, the RMSI PDCCH, the OSI PDCCH or the paging PDCCH, associated with the SSB within the second time window. Through the preset association, the UE may determine the PDCCH monitoring occasion in advance, and perform PDCCH monitoring merely at the PDCCH monitoring occasion, thereby greatly saving power consumption of the UE and reducing detection complexity.

Further, the preset association refers to an association between an n-th SSB in the SSB group and an n-th PDCCH monitoring occasion in each RMSI PDCCH monitoring occasion group, where n is an integer. Further, based on the preset association, after detecting the SSB with a strongest signal and determines that the SSB is the m-th SSB in a certain SSB group, the UE may monitor an m-th PDCCH monitoring occasion in each PDCCH monitoring occasion group.

Take the preset association between the at least one SSB group and the at least one RMSI PDCCH monitoring occasion group as an example. It is assumed that the base station uses 4 beams of different directions to cover a serving cell. The base station uses 4 beams of different directions to transmit SSB signals in sequence to complete beam scanning. Further, it is assumed that there are 16 possible SSB transmission time domain positions of the base station within the first time window. In this case, the at least one SSB group includes 4 SSB groups each of which includes 4 SSBs. The base station acquires the channel occupancy time at a time domain position of a certain SSB group based on the LBT mechanism, and transmits the SSB group at this position.

The UE obtains an SSB with a strongest signal by measuring SSB signals emitted by different beams (for example, the SSB with the strongest signal is the second SSB in the second SSB group). Based on the preset association between the SSB groups and the RMSI PDCCH monitoring occasion groups, the UE may determine that it only needs to monitor the RMSI PDCCH at the second PDCCH monitoring occasion in each PDCCH monitoring occasion group. Therefore, in the second time window, the UE can monitor the PDCCH merely at the second PDCCH monitoring occasion in each PDCCH monitoring occasion group. If it is still assumed that there are 16 PDCCH monitoring occasions that the base station may use in the second time window, with technical solutions provided in the embodiment of the present disclosure, the UE determines that the number of the PDCCH monitoring occasions for performing monitoring are 4 rather than 16, which is conducive to reducing complexity of PDCCH blind detection, saving power consumption, and improving user experience.

Figure 2:
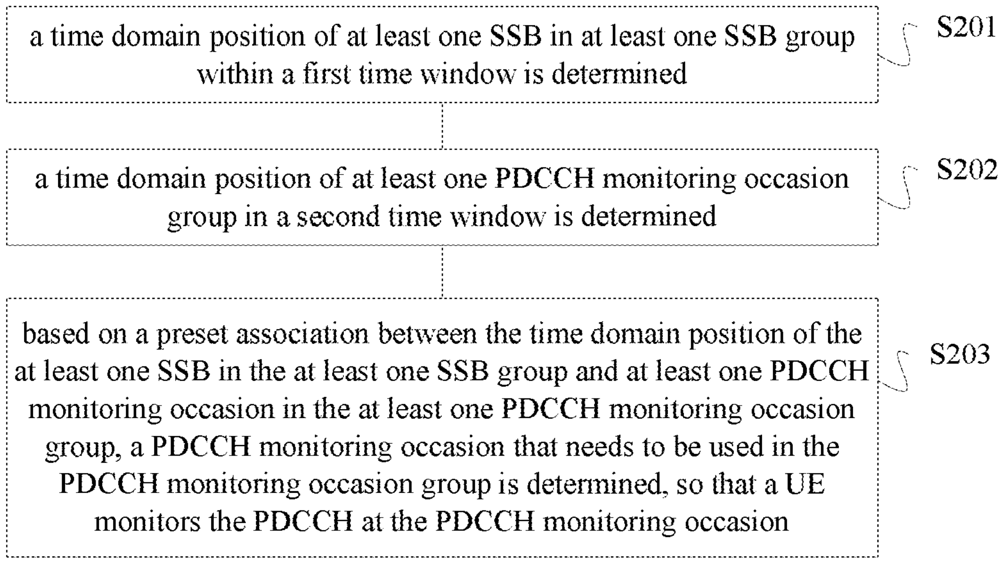
FIG. 2 is a flow chart of a method for PDCCH indicating in an unlicensed spectrum according to an embodiment.

FIG. 2 is a flow chart of a method for PDCCH indicating in an unlicensed spectrum according to an embodiment. The method may be applied at a network side, for example, performed by a base station. Referring to FIG. 1, the method may include S201, S202 and S203.

In S201, a time domain position of at least one SSB in at least one SSB group within a first time window is determined.

In S202, a time domain position of at least one PDCCH monitoring occasion group in a second time window is determined.

In S203, based on a preset association between the time domain position of the at least one SSB in the at least one SSB group and at least one PDCCH monitoring occasion in the at least one PDCCH monitoring occasion group, a PDCCH monitoring occasion that needs to be used in the PDCCH monitoring occasion group is determined, so that a UE monitors the PDCCH at the PDCCH monitoring occasion.

The first time window and the second time window may be predefined. The first time window and the second time window may be time windows for the network to acquire a channel occupancy time of the unlicensed spectrum, and a start time of the first time window is earlier than or equal to a start time of the second time window.

In some embodiments, in S201, the base station may determine the time domain position of the at least one SSB in the at least one SSB group within the first time window. Specifically, in the first time window, the base station may acquire a channel occupancy time of an unlicensed spectrum based on the LBT mechanism to determine the time domain position of the at least one SSB group within the first time window. There are one or more SSB groups in the first time window, and the SSB group is a predefined set of several SSBs.

Afterward, the base station may transmit the at least one SSB to the UE within the first time window.

In S202, in the second time window, the base station may acquire a channel occupancy time of the unlicensed spectrum based on the LBT mechanism to determine the time domain position of the at least one PDCCH monitoring occasion group in the second time window. There are one or more PDCCH monitoring occasion groups in the second time window, and the PDCCH monitoring occasion group is a predefined set of several PDCCH monitoring occasions.

In S203, the base station may, based on a preset association between the time domain position of the at least one SSB in the at least one SSB group and at least one PDCCH monitoring occasion in the at least one PDCCH monitoring occasion group, determine a PDCCH monitoring occasion that needs to be used in the PDCCH monitoring occasion group is determined, so that a UE monitors the PDCCH at the PDCCH monitoring occasion. Afterward, the base station may transmit the PDCCH to the UE.

In some embodiments, the preset association refers to an association between an n-th SSB in the SSB group and an n-th PDCCH monitoring occasion in each PDCCH monitoring occasion group, where n is an integer.

Those skilled in the art could understand that S201 to S203 can be regarded as steps that correspond to S101 to S102 in the embodiment as shown in FIG. 1, and the two are complementary in terms of specific implementation principles and logic. Therefore, explanation of terms and implementation steps at the network side can be referred to relevant descriptions of the embodiment as shown in FIG. 1, and are not described in detail here.

From above, by the embodiments, the preset association between the SSB on the unlicensed spectrum and the PDCCH monitoring occasion is established, so that the UE can determine the PDCCH monitoring occasion based on the preset association in advance, and decode the PDCCH at the PDCCH monitoring occasion to prevent the UE from overly monitor the PDCCH, thereby saving power consumption, reducing decoding complexity, and improving user experience.

Figure 3:
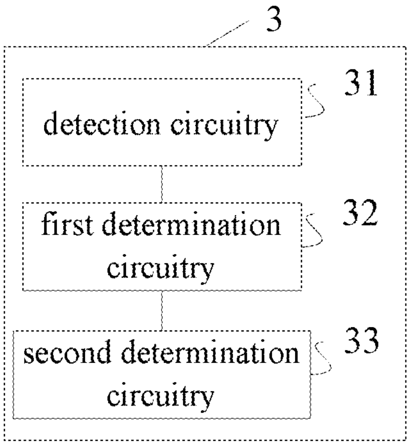
FIG. 3 is a structural diagram of an apparatus for PDCCH monitoring in an unlicensed spectrum according to an embodiment.

FIG. 3 is a structural diagram of an apparatus for PDCCH monitoring in an unlicensed spectrum according to an embodiment. The apparatus 3 may be applied at a UE side (such as an NR UE) to perform the method as shown in FIG. 1.

In some embodiments, the apparatus 3 may include a first determination circuitry 32 and a second determination circuitry 33.

In some embodiments, the first determination circuitry 32 is configured to determine a time domain position of at least one SSB in at least one SSB group transmitted by a network within a first time window, wherein the time domain position of the at least one SSB in the at least one SSB group has a preset association with at least one PDCCH monitoring occasion in at least one PDCCH monitoring occasion group. The second determination circuitry 33 is configured to determine, based on the preset association and in each PDCCH monitoring occasion group within a second time window, a PDCCH monitoring occasion at which monitoring needs to be performed, so as to monitor the PDCCH at the PDCCH monitoring occasion in each PDCCH monitoring occasion group within the second time window PDCCH.

In some embodiments, the first time window and the second time window are predefined. A start time of the first time window is earlier than or equal to a start time of the second time window.

In some embodiments, there are one or more SSB groups in the first time window, and the SSB group is a predefined set of several SSBs.

In some embodiments, the apparatus 3 further includes a detection circuitry 31 configured to: before the time domain position of the at least one SSB in the at least one SSB group transmitted by the network within the first time window is determined, detect the at least one SSB transmitted by the network within the first time window.

In some embodiments, there are one or more PDCCH monitoring occasion groups in the second time window, and the PDCCH monitoring occasion group is a predefined set of several PDCCH monitoring occasions.

In some embodiments, the preset association refers to an association between an n-th SSB in the SSB group and an n-th PDCCH monitoring occasion in each PDCCH monitoring occasion group, where n is an integer.

More details of working principles and working modes of the apparatus 3 can be found in the above descriptions of the method as shown in FIG. 1, and are not described here.

Figure 4:
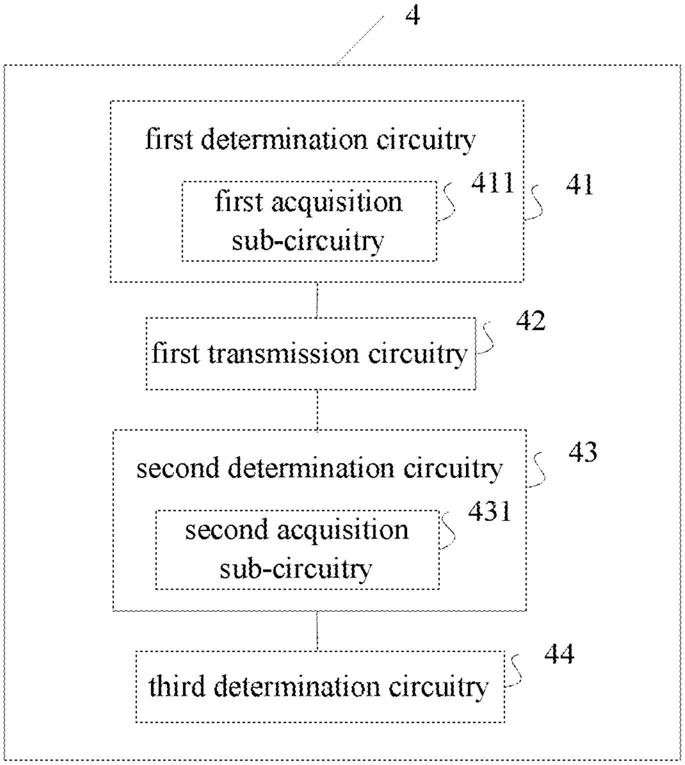
FIG. 4 is a structural diagram of an apparatus for PDCCH indicating in an unlicensed spectrum according to an embodiment.

FIG. 4 is a structural diagram of an apparatus for PDCCH indicating in an unlicensed spectrum according to an embodiment. The apparatus 4 may be applied at a network side (such as an NR base station) to perform the method as shown in FIG. 2.

In some embodiments, the apparatus 4 may include a first determination circuitry 41, a second determination circuitry 43 and a third determination circuitry 44.

In some embodiments, the first determination circuitry 41 is configured to determine a time domain position of at least one SSB in at least one SSB group within a first time window. The second determination circuitry 43 is configured to determine a time domain position of at least one PDCCH monitoring occasion group in a second time window. The third determination circuitry 44 is configured to determine, based on a preset association between the time domain position of the at least one SSB in the at least one SSB group and at least one PDCCH monitoring occasion in the at least one PDCCH monitoring occasion group, a PDCCH monitoring occasion that needs to be used in the PDCCH monitoring occasion group, so that a UE monitors the PDCCH at the PDCCH monitoring occasion.

In some embodiments, the preset association refers to an association between an n-th SSB in the SSB group and an n-th PDCCH monitoring occasion in each PDCCH monitoring occasion group, where n is an integer.

In some embodiments, the first time window and the second time window are predefined. A start time of the first time window is earlier than or equal to a start time of the second time window.

In some embodiments, there are one or more SSB groups in the first time window, and the SSB group is a predefined set of several SSBs.

In some embodiments, the first determination circuitry 41 includes a first acquisition sub-circuitry 411 configured to: in the first time window, acquire a channel occupancy time of an unlicensed spectrum based on LBT mechanism to determine the time domain position of the at least one SSB group within the first time window.

In some embodiments, the apparatus 4 further includes a first transmission circuitry 42 configured to: after the time domain position of the at least one SSB in the at least one SSB group within the first time window is determined, transmit the at least one SSB to the UE within the first time window.

In some embodiments, the second determination circuitry 43 includes a second acquisition sub-circuitry 431 configured to: in the second time window, acquire a channel occupancy time of an unlicensed spectrum based on LBT mechanism to determine the time domain position of the at least one PDCCH monitoring occasion group in the second time window.

In some embodiments, there are one or more PDCCH monitoring occasion groups in the second time window, and the PDCCH monitoring occasion group is a predefined set of several PDCCH monitoring occasions.

More details of working principles and working modes of the apparatus 4 can be found in the above descriptions of the method as shown in FIG. 2, and are not described here.

Signaling interaction between a UE and a network (for example, an NR base station) using the embodiment of the present disclosure is further described below in conjunction with a typical application scenario.

Figure 5:
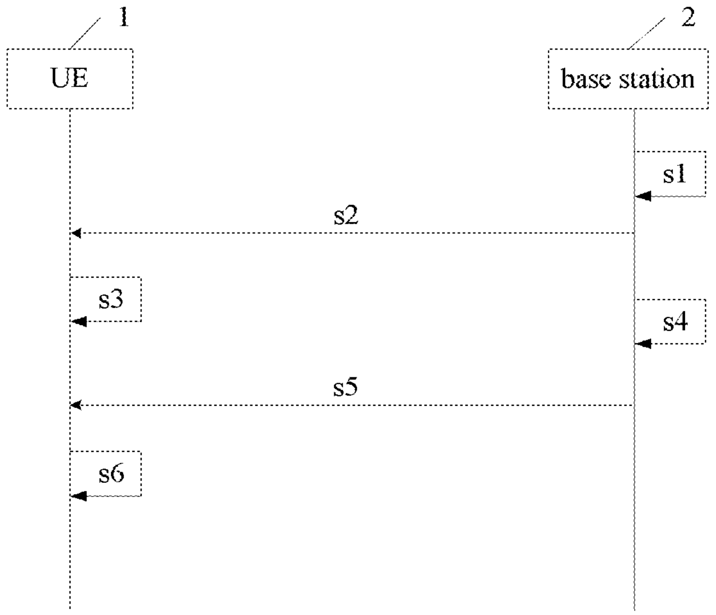
FIG. 5 is a diagram of signaling interaction in a typical scenario according to an embodiment.

In the typical application scenario, referring to FIG. 5, the UE 1 and the base station 2 are deployed on an unlicensed spectrum. When the UE 1 and the base station 2 transmit downlink control information, following steps may be included.

First, the base station 2 may perform s1, that is, perform LBT to acquire a channel occupancy time of the unlicensed spectrum, and determine a time domain position of an SSB group within a first time window.

Afterward, the base station 2 may perform s2, that is, transmit an SSB to the UE 1.

Afterward, the UE 1 may perform s3, that is, detect the SSB within the first time window, and based on a preset association between the time domain position of the SSB in the SSB group and a PDCCH monitoring occasion in a PDCCH monitoring occasion group, determine a PDCCH monitoring occasion.

Afterward, the base station 2 may perform s4, that is, perform LBT in the second time window to acquire a channel occupancy time of the unlicensed spectrum, so as to determine a time domain position of the PDCCH monitoring occasion group in the second time window.

Afterward, the base station 2 may perform s5, that is, transmit the PDCCH to the UE 1 based on the time domain position.

Afterward, the UE 1 may perform s6, that is, monitor the PDCCH at the determined PDCCH monitoring occasion to obtain the downlink control information.

More details of working principles and working modes of the UE 1 and the base station 2 in the application scenario as shown in FIG. 5 can be found in relevant descriptions of FIG. 1 and FIG. 2, and are not described here.

In an embodiment of the present disclosure, a storage medium having computer instructions stored therein is provided, wherein when the computer instructions are executed, the above method as shown in FIG. 1 or the above method as shown in FIG. 2 is performed. In some embodiments, the storage medium may be a computer readable storage medium, such as a nonvalatile memory or a nontransitory memory. The computer readable storage medium mar include a Read Only Memory (ROM), a Random Access Memory (RAM), a magnetic disk or an optical disk.

In an embodiment of the present disclosure, a terminal including a memory and a processor is provided, wherein the memory has computer instructions stored therein, and when the processor executes the computer instructions, the above method as shown in FIG. 1 is performed. In some embodiments, the terminal may be an NR UE.

In an embodiment of the present disclosure, a base station including a memory and a processor is provided, wherein the memory has computer instructions stored therein, and when the processor executes the computer instructions, the above method as shown in FIG. 2 is performed. In some embodiments, the base station may be an NR base station.

Although the present disclosure has been disclosed above with reference to preferred embodiments thereof, it should be understood that the disclosure presented by way of example only, and not limitation. Those skilled in the art can modify and vary the embodiments without departing from the spirit and scope of the present disclosure.

What is claimed is:

1. A method for Physical Downlink Control Channel (PDCCH) monitoring, performed by a terminal and comprising:

determining a time domain position of a Synchronization Signal Block (SSB) in an SSB group transmitted by a network within a first time window, wherein the SSB in the SSB group has a preset association with at least two PDCCH monitoring occasions in at least two PDCCH monitoring occasion groups in a second time window, each SSB group is a predefined set of several SSBs, and the first time window is predefined; and determining, based on the preset association and in each PDCCH monitoring occasion group within the second time window, a PDCCH monitoring occasion at which monitoring needs to be performed, so as to monitor PDCCH at the PDCCH monitoring occasion in each PDCCH monitoring occasion group within the second time window, wherein each PDCCH monitoring occasion group is a predefined set of several PDCCH monitoring occasions, and the preset association refers to an association between an n-th SSB in the SSB group and an n-th PDCCH monitoring occasion in each of the PDCCH monitoring occasion group, where n is an integer.

2. The method according to claim 1, further comprising:

before determining the time domain position of the SSB in the SSB group transmitted by the network within the first time window, detecting the SSB transmitted by the network within the first time window.

3. The method according to claim 1, wherein a start time of the first time window is earlier than or equal to a start time of the second time window.

4. A non-transitory storage medium having computer instructions stored therein, wherein when the computer instructions are executed, the method of claim 1 is performed.

5. A terminal comprising a memory and a processor, wherein the memory has computer instructions stored therein, and when the processor executes the computer instructions, the method of claim 1 is performed.

6. A method for Physical Downlink Control Channel (PDCCH) indicating in an unlicensed spectrum, performed by a base station and comprising:

determining a time domain position of a Synchronization Signal Block (SSB) in an SSB group within a first time window, wherein each SSB group is a predefined set of several SSBs, and the first time window is predefined;

determining at least two PDCCH monitoring occasion groups in a second time window, wherein each PDCCH monitoring occasion group is a predefined set of several PDCCH monitoring occasions; and determining a PDCCH monitoring occasion that needs to be used in each PDCCH monitoring occasion group based on a preset association between the SSB in the SSB group and at least two PDCCH monitoring occasions in the at least two PDCCH monitoring occasion groups, so that a User Equipment (UE) monitors the PDCCH at the PDCCH monitoring occasion, wherein the preset association refers to an association between an n-th SSB in the SSB group and an n-th PDCCH monitoring occasion in each PDCCH monitoring occasion group, where n is an integer.

7. The method according to claim 6, wherein determining the time domain position of the SSB in the SSB group within the first time window comprises:

in the first time window, acquiring a channel occupancy time of the unlicensed spectrum based on Listen Before Talk (LBT) mechanism to determine the time domain position of the SSB in the SSB group within the first time window.

8. The method according to claim 7, further comprising: after determining the time domain position of the SSB in the SSB group within the first time window, transmitting the SSB to the UE within the first time window.

9. The method according to claim 6, wherein determining the at least two PDCCH monitoring occasion groups in the second time window comprises:

in the second time window, acquiring a channel occupancy time of the unlicensed spectrum based on LBT mechanism to determine the at least two PDCCH monitoring occasion groups in the second time window.

10. The method according to claim 6, wherein a start time of the first time window is earlier than or equal to a start time of the second time window.

11. A base station comprising a memory and a processor, wherein the memory has computer instructions stored therein, and when the processor executes the computer instructions, the method of claim 6 is performed.

12. A non-transitory storage medium having computer instructions stored therein, wherein when the computer instructions are executed, the method of claim 6 is performed.

13. An apparatus for Physical Downlink Control Channel (PDCCH) monitoring, comprising:

a first determination circuitry configured to determine a time domain position of a Synchronization Signal Block (SSB) in an SSB group transmitted by a network within a first time window, wherein the SSB in the SSB group has a preset association with at least two PDCCH monitoring occasions in at least two PDCCH monitoring occasion groups in a second time window, each SSB group is a predefined set of several SSBs, and the first time window is predefined; and a second determination circuitry configured to determine, based on the preset association and in each PDCCH monitoring occasion group within the second time window, a PDCCH monitoring occasion at which monitoring needs to be performed, so as to monitor PDCCH at the PDCCH monitoring occasion in each PDCCH monitoring occasion group within the second time window, wherein each PDCCH monitoring occasion group is a predefined set of several PDCCH monitoring occasions, and the preset association refers to an association between an n-th SSB in the SSB group and an n-th PDCCH monitoring occasion in each PDCCH monitoring occasion group, where n is an integer.

14. The apparatus according to claim 13, further comprising:

a detection circuitry configured to: before the time domain position of the SSB in the SSB group transmitted by the network within the first time window is determined, detect the SSB transmitted by the network within the first time window.

* * * * *